A. NICOL.
MEASURING INSTRUMENT.
APPLICATION FILED APR. 11, 1913.
1,098,916.
Patented June 2, 1914.
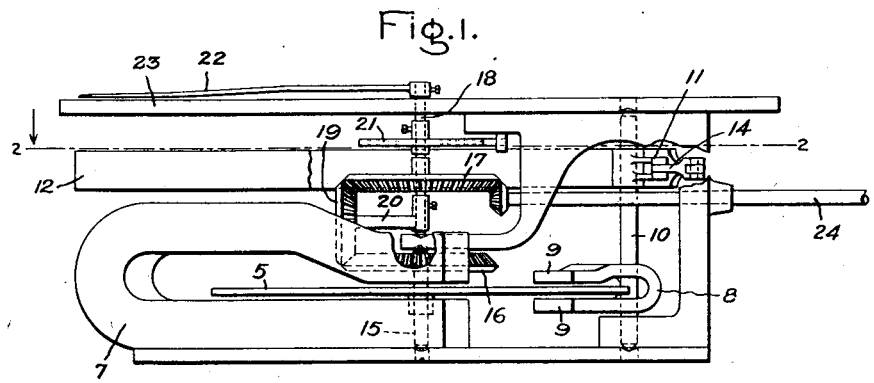
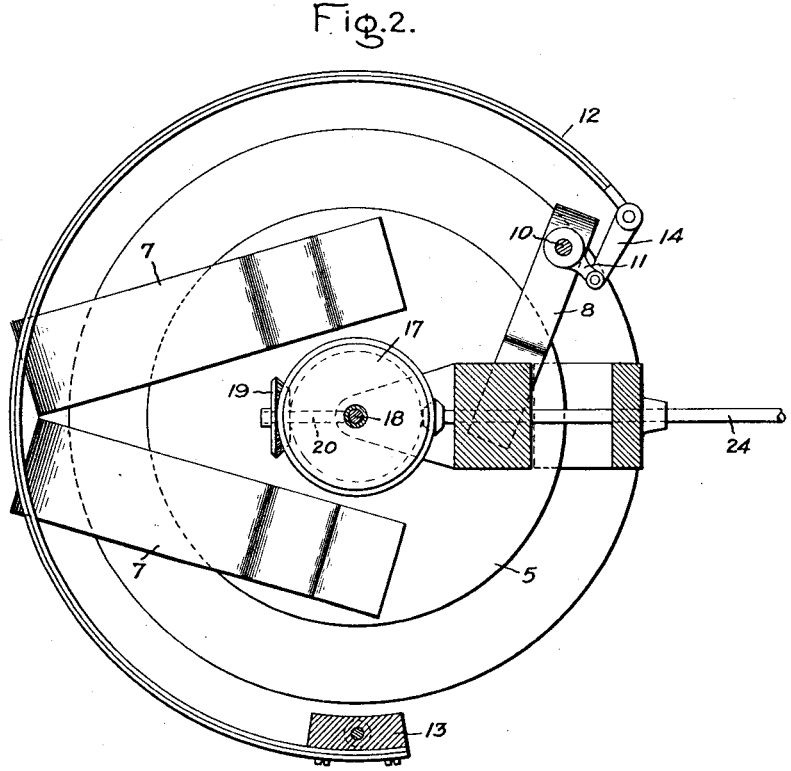
Witnesses:
Marcus L. Byng.
J. Ellis Elten
Inventor:
August Nicol,
by Albert G. Davis
His Attorney.

UNITED STATES PATENT OFFICE.

AUGUST NICOL, OF NIEDER-SCHÖNHAUSEN, GERMANY, ASSIGNOR TO GENERAL ELECTRIC COMPANY, A CORPORATION OF NEW YORK.

MEASURING INSTRUMENT.

1,098,916.  Specification of Letters Patent.  Patented June 2, 1914.

Application filed April 11, 1913. Serial No. 760,453.

*To all whom it may concern:*

Be it known that I, AUGUST NICOL, a subject of the King of Prussia, residing at Nieder-Schönhausen, Germany, have invented certain new and useful Improvements in Measuring Instruments, of which the following is a specification.

My invention relates to measuring instruments having a disk or armature in which eddy currents are generated by the rotation of the disk in a magnetic field.

The invention is particularly adapted for use in a speed measuring instrument, in which a rotatable disk is retarded or braked by a fixed magnet, and the retarding or braking action, which is proportional to the speed to be measured, is transmitted to an indicating pointer through suitable instrumentalities.

A measuring instrument dependent for its action upon eddy currents generated in a closed circuit, such as a disk or armature of low electrical resistance, is accurate only at the temperature at which it is calibrated, since the high temperature coefficient of copper, and similar low resistance metals, causes marked variations in the electrical resistance of those metals as the temperature varies. This error is particularly objectionable in speed measuring instruments which are subjected to widely varying temperatures while in use.

The object of my invention is to provide a simple, inexpensive and reliable means for compensating for changes in temperature in measuring instruments which are dependent for their action on eddy currents generated in a disk or armature of conducting material.

In carrying out my invention, I arrange a rotatable disk within the field of influence of a retarding or braking magnet whose effective braking moment with respect to the disk is adapted to be varied by a temperature responsive device, such as a thermostatic member.

The novel and patentable features which I believe to be characteristic of my invention are definitely indicated in the claims appended hereto.

The construction and mode of operation of a speed measuring instrument embodying my invention will be understood from the following description taken in connection with the accompanying drawings, in which:

Figure 1 is a front elevation of a measuring instrument embodying the novel features of my invention, and Fig. 2 is a sectional view taken on the line 2—2 of Fig. 1.

Although my invention is useful in connection with any measuring instrument dependent for its operation on eddy currents generated in a metallic disk, I have illustrated the invention embodied in a speed indicator. It will, however, be understood that this application of my invention is merely for the purpose of illustration, and I do not desire to limit the application of my invention to speed measuring instruments.

The speed measuring instrument which I have shown in the drawings comprises a metallic disk or armature 5 rotatably mounted between the poles of two fixed permanent magnets 7. An auxiliary magnet 8 having its oppositely positioned poles 9 arranged on opposite sides of the disk 5 is rigidly secured to a pivoted shaft 10. An arm 11 is rigidly secured to the shaft 10 and is operatively connected to a bi-metallic thermostatic member 12 of semi-circular configuration. By reference to Fig. 2 of the drawings, it will be observed that one end of the termostatic member is secured to a fixed part 13 of the instrument, while the other end is pivoted to a link 14. The link 14 is also pivotally connected to the arm 11.

It will be readily observed from the drawings that the auxiliary magnet 8 is so arranged that the distance between its poles 9 and the axis of rotation of the disk 5 can be varied. The effective braking moment of the magnet 8 with respect to the disk 5 is adjustable by varying the distance between the poles of the magnet and the axis of the disk. The operative connection between the pivoted magnet 8 and the thermostatic member 12 thus provides an automatic adjustment of the distance betwen the poles of the magnet and the axis of the disk, which if properly designed is sufficient to compensate for the errors due to changes in temperature.

Reference to Fig. 1 of the drawings will explain the arrangement of the other operative elements of the speed measuring instrument with the rotatable disk 5. The disk 5 is rigidly secured to a pivoted shaft 15 to which is also secured one member 16 of a differential gearing. The other member 17 of the differential gearing is loosely mounted on a pivoted shaft 18. The planetary gear member 19 of the differential gearing is loosely mounted on an arm 20, and the arm 20 is rigidly secured to the shaft 18. A control spring 21 is also secured to the shaft 18 and normally tends to maintain the shaft 18 and planetary gear member 19 in an initial or zero position. An indicating member or pointer 22 is secured to the shaft 18 and is arranged to sweep across a suitable scale 23.

The operation of the device is briefly as follows: The gear member 17 is adapted to be driven by a shaft 24 which is rotated at a speed proportional to the speed to be measured. The rotation of the gear member 17 is transmitted to the disk 5 by the planetary gear member 19 and the gear member 16. The rotation of the disk 5 in the magnetic field produced by the magnets 7 and 8 generates eddy currents within the disk and the disk is retarded or braked in the well known manner. This retarding action causes the planetary gear member 19 and arm 20 to turn through a small angle and until the opposing tension of the spring 21 equals the braking action of the magnets on the disk 5. At this point the pointer 22 comes to zero, and its position on the scale 23 is an indication of the speed to be measured. The thermostatic member 12 is responsive to and influenced by changes in temperature and operates to turn the auxiliary braking magnet 8 about its pivot upon changes in temperature. The effective braking moment of the magnet with respect to the disk is thus varied and the variation so produced is designed to compensate the instrument for errors due to changes in temperature, so that the indications of the instrument are accurate at all temperatures.

While I have illustrated two fixed magnets and an adjustable magnet, it will be understood that other arrangements may be employed without departing from the spirit of my invention. I do not wish, therefore, to be limited to the details of construction herein illustrated and described by way of example. I, accordingly, aim in the appended claims to cover all modifications within the spirit and scope of my invention.

What I claim as new and desire to secure by Letters Patent of the United States, is:—

1. A measuring instrument comprising a metallic disk rotatably mounted, a braking magnet positioned to retard the rotation of said disk, and temperature responsive means arranged to adjust the relative location of the magnet and disk to vary the effective braking moment of said magnet with respect to said disk to compensate for changes in temperature.

2. A measuring instrument comprising a metallic disk rotatably mounted, a magnet positioned to retard the rotation of said disk, means for mounting said magnet so that the distance between the poles of the magnet and the axis of the disk can be varied, and a thermostatic member operatively related to said magnet.

3. A measuring instrument comprising a metallic disk rotatably mounted, a pivoted braking magnet having its poles positioned on opposite sides of said disk, and a thermostatic member operatively related to said magnet and adapted to turn the magnet about its pivot to compensate the effective braking action of the magnet on the disk for changes in temperature.

4. A measuring instrument comprising a metallic disk rotatably mounted, a magnet having oppositely positioned poles arranged on opposite sides of the disk, means for mounting said magnet so that the distance between the poles of the magnet and the axis of the disk can be varied, and a thermostatic member operatively connected to said magnet and adapted to vary the distance between the poles of the magnet and the axis of the disk to compensate for changes in temperature.

5. A measuring instrument comprising means for producing a magnetic field, a metallic disk rotatably mounted in said field, a pivotally mounted magnet arranged to retard the rotation of said disk, and a thermostatic member operatively arranged to turn said magnet about its pivot for changing the effective retarding moment of said magnet on said disk upon changes in temperature.

6. A measuring instrument comprising a metallic disk rotatably mounted, a magnet positioned to retard the rotation of said disk, means for mounting said magnet so that the effective retarding moment of the poles of the magnet with respect to the disk is adjustable, and a temperature responsive device operatively related to said magnet and adapted to produce such adjustment of the poles of the magnet with respect to the disk to compensate for changes in temperature.

7. A measuring instrument comprising means for producing a magnetic field, a metallic disk rotatably mounted in said field, a magnet positioned to retard the rotation of said disk, means for mounting said magnet so that the distance between the poles of the magnet and the axis of the disk can be varied, and a thermostatic member operatively related to said magnet and adapted to vary the distance between the poles of the magnet and the axis of the disk to compensate for changes in temperature.

8. A measuring instrument comprising means for producing a magnetic field, a metallic disk rotatably mounted in said field, a magnet having oppositely positioned poles arranged on opposite sides of the disk, means for mounting said magnet so that the distance between the poles of the magnet and the axis of the disk can be varied, and a thermostatic member operatively related to said magnet and adapted to vary the distance between the poles of the magnet and the axis of the disk to compensate for changes in temperature.

9. A measuring instrument comprising means for producing a magnetic field, a metallic disk rotatably mounted in said field, a magnet having oppositely positioned poles arranged on opposite sides of the disk, a pivot about which said magnet is arranged to turn so that the distance between the poles of the magnet and the axis of the disk can be varied, a thermostatic member having one end secured to a fixed part of the instrument, and means operatively connecting the other end of the thermostatic member to the magnet so that the magnet is caused to turn about its pivot by said thermostatic member upon changes in temperature.

In witness whereof, I have hereunto set my hand 1913.

AUGUST NICOL.

Witnesses:
KARL SCHMIEDEL,
ALFRED HERMANN.